Figure 1:
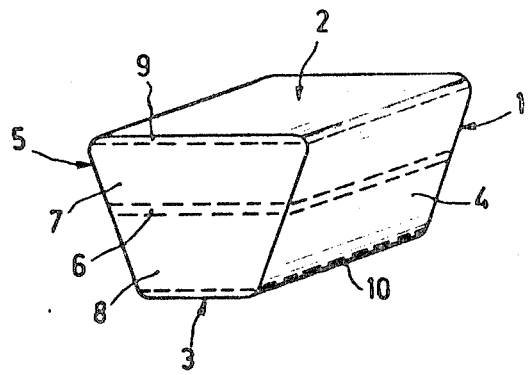

United States Patent

[11] 3,621,256

[72] Inventors: Jean Antoine Cacheux; Johannes Meuleman, both of Caen, France
[21] Appl. No.: 800,405
[22] Filed: Feb. 19, 1969
[45] Patented: Nov. 16, 1971
[73] Assignee: U. S. Philips Corporation, New York, N.Y.
[32] Priority: Feb. 19, 1968
[33] France
[31] 140341

[54] POLYGONAL-SHAPED RADIATION DETECTOR EMPLOYING PLURAL PRISM-SHAPED SEMICONDUCTOR CRYSTALS
6 Claims, 4 Drawing Figs.

[52] U.S. Cl. .................................................. 250/83, 250/83.3
[51] Int. Cl. .................................................. G01t 1/24
[50] Field of Search .......................................... 250/83, 83.3, 71.5 S

[56] References Cited
UNITED STATES PATENTS
3,233,102  2/1966  Packard ...................... 250/71.5
3,293,435  12/1966  Huth ........................... 250/83.3

Primary Examiner—James W. Lawrence
Assistant Examiner—Davis L. Willis
Attorney—Frank R. Trifari ABSTRACT: The invention relates to a semiconductor detector for measuring and/or detecting ionizing radiation, having a large sensitive volume, particularly for gamma spectrometry.

PATENTED NOV 16 1971

3,621,256

SHEET 1 OF 2

INVENTORS
J.A. CACHEUX &
J. MEULMAN
BY
*Frank R. Trifari*
AGENT

POLYGONAL-SHAPED RADIATION DETECTOR EMPLOYING PLURAL PRISM-SHAPED SEMICONDUCTOR CRYSTALS

It is known that the possibilities of use of radiation detectors can be extended by enlarging the volume of the sensitive portion of the detectors. By enlarging the surface of the plane of incidence and of the useful section of the semiconductor crystal the quantity of incident radiation received may be increased, while by enlarging the thickness of the sensitive portion the radiation absorption can be increased, particularly when the radiation has a great penetration depth.

In the gamma spectrometry there are known lithium- compensated germanium detectors having flat junctions and thick sensitive zones. It is known that lithium is an interstitional donor element having a very high diffusion coefficient and when incorporated as an impurity in a semiconductor crystal of P-type conductivity it tends to neutralize the effect of the acceptor atoms, for example, of boron, in the crystal. Appropriate choice of the concentrations of the P-type impurities and of lithium permits of obtaining a compensated semiconductor zone having a practically intrinsic conductivity and a high resistivity, which may form a thick sensitive zone for the detection of ionizing radiation. The thickness of such a compensated sensitive zone, which may be obtained by the supply of lithium ions from a surface in the crystal under the action of an electric field, is, however, restricted. Thicker compensated zones have been obtained by diffusing lithium into the crystal simultaneously from two opposite faces of a crystal. By known techniques sensitive zones may be obtained whose thickness is restricted to about 20 mms at the most, while the sensitive volume is about 15 ccms$^3$ at the most.

There are furthermore known so-called coaxial detectors having a large sensitive volume, in which the crystal has the shape of a cylinder or of a prism having a trapezoidal base. The latter shape matches that of single crystals obtained by crystallization in a horizontal boat. These coaxial detectors have a junction of substantially cylindrical shape, the axis of which is parallel to the generatrices of the detector.

The volume of the sensitive portion of this coaxial detector is limited by the volume of the obtainable single crystals and it should be noted that, as is known the probability of crystal defects rapidly increases with the dimensions of the single crystals. Although detectors of this kind of may be made with a volume of the order of for example 50 ccms pulling of the single crystals involves too many problems for industrial manufacture. Moreover, the depth of the lithium-compensated zone which is obtainable as a maximum, and which is formed by diffusion from the outer surface of the cylinder and/or from the surface of a cavity thereof, restricts the dimensions of the detector, while this involves complications of the processes.

Moreover, in these cylindrical or prismatic detectors the distribution of the electric field is not as uniform as in a detector having a flat junction. The collecting times of the charges and the rise times of the pulses are variable and the resolving power is lower. IN addition, the capacitance of these detectors is very high.

In addition, in order to facilitate transport and storage and to maintain the quality of the detector the detector is preferably to be provided with a closed envelope protecting it from soiling. This is the more required for lithium-compensated germanium detectors because are employed at a temperature comparable with that of liquid nitrogen and have to be stored at low temperatures.

In order to obtain a high detection efficiency and a high resolving power it is advantageous to have a detector of large sensitive volume available which has one or more flat junctions bounding a uniform field, while the single crystal has minimum dimensions and is provided with an effective protection.

The invention has for its object to provide a detector which satisfies these conditions and is based on the recognition of the fact that this can be achieved by composing the detector of a plurality of detection elements having flat junctions, the shape of the detection elements being advantageously chosen so that a detector of coaxial structure can be obtained, in which on the one hand the advantages of detectors having flat junctions are combined with those of coaxial, large-volume detectors and on the other hand the requirements for protection and the aforesaid conditions of use are satisfied.

According to the invention, a semiconductor detector of the kind set forth is characterized in that it comprises a plurality of semiconductor detection elements whose semiconductor crystals have the shape of a prism having an equal-sided trapezoidal base and at least one semiconductor junction extending approximately parallel to the two parallel side faces of the crystal, said detection elements being arranged in a regular polygon so that the smaller of said parallel side faces of each crystal is orientated towards the center of the polygon.

Consequently, the detector according to the invention has the structure of a coaxial detector. The useful sensitive zones form a regular polygonal ring, while each sensitive zone and each semiconductor junction has a flat structure.

In a preferred embodiment of the invention each detection element comprises a semiconductor germanium crystal whose portions adjacent of the two parallel side faces are of the one conductivity type, whereas between these portions two practically completely compensated zones are located which are separated from each other by a stratified zone of the other conductivity type.

The two portions of the one conductivity type are preferably doped with lithium, the two zones being compensated by lithium diffusion under the action of an applied electric field. The shape of each element matches that of single crystals as obtained by known techniques by horizontal crystallization and therefore these crystals can be used substantially without loss of material.

All detection elements are identical so that they can be exchanged and each defective element can be simply replaced so that one defect does not render the whole detector unserviceable.

As compared with the conventional coaxial detector having the same sensitive volume, the detector according to the invention has greater reliability, since the quality of the separate small single crystals will usually be superior to that of one large single crystal of the known detector. X The detection elements of the detector according to the invention may be joined inside a common, closed envelope or be arranged without an envelope in apparatus such as cryostats, vacuum spaces and so on.

Each detection element is preferably provided with a closed envelope having the shape of a prism surrounding the single crystal and having a trapezoidal base.

With lithium-compensated germanium detectors it is often necessary to carry out a redistribution of the lithium ions during the last manufacturing stage or during use in order to restore the compensation in the sensitive zone. The construction of the detector according to the invention in which the detection elements are arranged separately in a prismatic envelope having a trapezoidal base renders this redistribution feasible in a simple manner.

The annular structure of the detector according to the invention has a fairly large free space in the axis of the detector so that it may be employed as a detector of the "well" -type for analyzing a sample arranged in the center of the ring.

The number of detection elements of the detector according to the invention is not restricted. In an advantageous embodiment this number is 3 to 12 and the angle between the nonparallel side faces of each envelope or of each crystal is then equal to the quotient of 360° and said number. This angle is equal to 45° in the case of eight elements.

Each detection element itself is a detector having a flat junction and a uniform field and a symmetrical structure which permits of obtaining very high resolving powers supplying pulses of short rise time, because the collecting times of the charge carriers are very short.

An advantage of the multiple structure of the detector according to the invention is furthermore that the detection elements may separately be associated with an electronic amplifying device or at least preamplifier so that high counting frequencies can be obtained.

The structure of each detection element is furthermore such that an improved detection factor is obtained by the reduction of the Compton effect. If radiation penetrates through the smaller of the two parallel side faces the trapezoidal shape provides an improved ratio between the peak value due to the overall energy and the peak value due to the Compton effect. If opposite elements of a detector are connected to separate preamplifiers in coincidence a separation can be obtained between the signal produced by the photoelectric effect and the signal produced by the Compton effect.

The dimensions of each detection element and those of the detector according to the invention may be adapted to the desired use. For gamma spectrometry of radiation of about 2MeV the larger of the two parallel side faces of each element is preferably approximately square.

It is advantageous for each detection element to have a germanium crystal crystallized along the (111) plane, having lithium-compensated zones and arranged in a closed envelope, preferably of aluminum, which envelope forms one of the electrodes of the detection element. The two other electrodes may be taken through the wall by an insulated passage and inside the envelope a lower gas pressure or vacuum may be used.

Such envelopes can be manufactured in a conventional manner. Each envelope may be closed by cold-welding at the bottom or upper face of the prism.

The various elements of a detector according to the invention may, of course, also be used separately or be joined to form part of a ring.

In some cases it may be advantageous to increase further the volume of the detector by arranging a coaxial detector in the central, free space, for use together with the annular elements.

Figure 2:
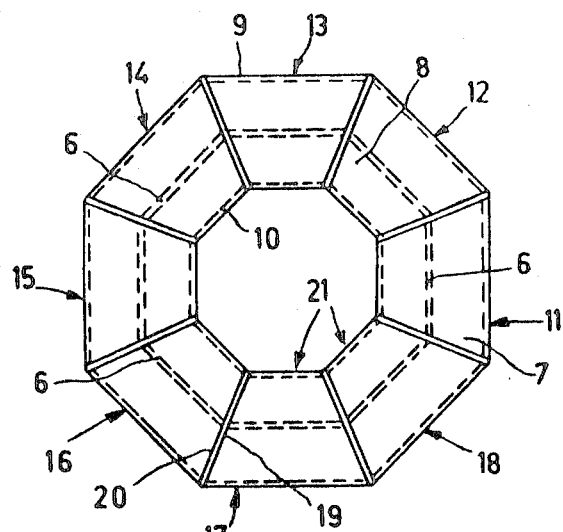
Figure 3:
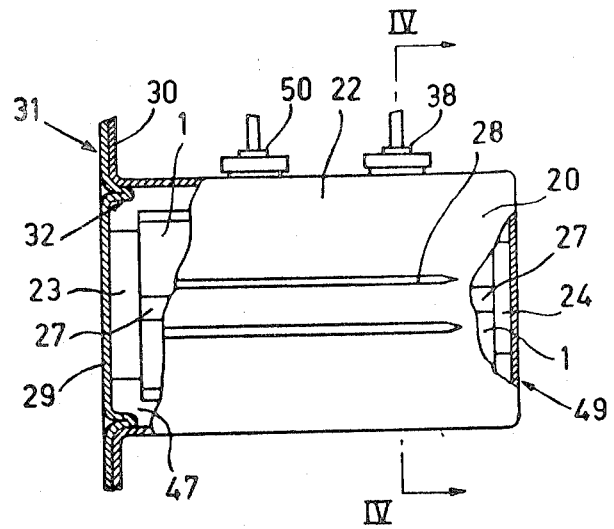
Figure 4:
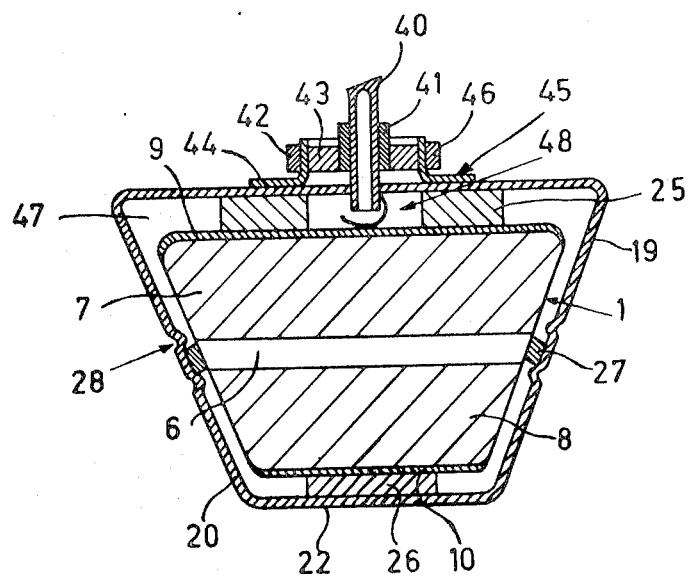

The invention will be described more fully with reference to the drawing, in which FIG. 1 is a diagrammatic perspective view of a detection element in accordance with the invention, FIG. 2 is a diagrammatic sectional view of a semiconductor detector in accordance with the invention, comprising a plurality of detection elements of the type shown in FIG. 1, FIG. 3 is a schematic side elevation of a detection element having a closed envelope and FIG. 4 is a schematic sectional view taken on the plane IV—3 IV in FIG. 3.

The detection element shown in FIG. 1 comprises a single crystal 1 having the form of a prism with an isosceles, trapezoidal base. This element thus has two parallel side faces 2 and 3 and two oblique side faces 4 and 5. The crystal 1 may have a central P-type zone 6, to which on both sides are joined a thick, practically intrinsic zone 7, 8 respectively and an N-type zone 9 and 10 respectively. These zones are bounded by flat faces extending substantially parallel to the faces 2 and 3 and forming semiconductor junctions.

The practically intrinsic zones may be formed in a conventional manner by diffusion of lithium ions into the semiconductor crystal under the action of an electric field from the two faces 2 and 3, which crystal may be of P-type germanium.

The detector shown schematically in FIG. 2 comprises eight prismatic elements 11 to 18 having isosceles, trapezoidal bases. These elements 11 to 18 may be of the kine of shown in FIG. 1. They may be directly joined or be provided separately with a prismatic, closed envelope. Each prismatic element 11 to 18 is arranged so that its oblique side face 19 (corresponding with the face 4 of the crystal 1) is orientated to the side face 20 (corresponding with the face 5 of crystal 1) or a further adjacent crystal and the two side faces 21 (corresponding with face 3 of crystal 1) of two adjacent elements 11 to 18 are oriented to the same side so that the elements together form a regular polygon, in which the smaller ones (21) of the parallel side faces of the detection elements are orientated towards the center of the polygon.

Like in FIG. 1 the P-type zones 6, the practically intrinsic zones 7 and 8 and the N-type. zones 9 and 10 are indicated by broken lines. These zones form together concentric, substantially annular sets.

In FIG. 2 the arrangement holding the elements 11 to 18 together and providing the rigidity of the assembly is not shown for the sake of clarity. A simple metal or, if necessary, insulating strap will suffice and as a matter of course the device in which the detector is employed, for example, the cryostat to which or in which it is fastened plays a part.

FIGS. 3 and 4 show a semiconductor crystal in a separate prismatic envelope.

The single crystal 1 is held in place in an envelope 22 by means of blocks 23 to 27 of insulating material, for example, polytetrafluoroethylene. The blocks 27 are held in position by ridges in the wall of the envelope and at the position of the P-type zone 6 they bear on the side faces 4 and 5 of the single crystal. The blocks 27 may be provided with a metallic layer, preferably aluminum, so that they may establish an electric connection between the zones 6 and the envelope.

The envelope 22 is provided with a lid 29, fastened by a cold weld 31 to the collar 30 of the envelope. Because this connection, which has to be airtight, has to resist the temperature differences to which the detector is exposed, *inter alia* when it is cooled to the temperature of liquid nitrogen, the lid is provided with a deep groove 32 for avoiding undesirable stress.

The connections to the N-type zones 9 and 10 established via two passages 38 and 50.

SAid passages are airtight. They are formed, for example, by a metal tube 40, preferably of copper, soldered in a ferronickel sleeve 41 and insulated from a ferronickel ring 42 by an insulating ring 43. The ring 42 is soldered to a punched copper part 44, which is fastened by a cold weld 45 on the envelope usually of aluminum.

One of the tubes 40 is provided by welding with an elastic tag. This tag establishes a pressure contact with the zone 9. The other tube has fastened to it an insulated conductor (not shown in FIG. 4, which establishes the contact with the zone 10.

Inside the envelope, in the space 47 between the envelope and the crystal 1, vacuum prevails which is obtained through the tubes 40, which can be closed subsequently by compression. The envelope may, as an alternative, contain an inert gas under low pressure.

The envelope described above is preferably made of aluminum of about 0.5 mm. in thickness.

The connections of the various regions of a single crystal may differ from those shown in FIGS. 3 and 4. For example, the lid 29 at the bottom of the envelope 49 may be provided with an insulated passage similar to the passage 50 or of a different type. In some cases a surface zone, for example, the zone 10 or 9 (FIG. 4) may be connected with the envelope by direct pressure contact.

In the case of envelopes of the kind shown in FIGS. 3 and 4 the detection elements may be arranged in order of succession in one direction and in the opposite direction so that the side faces 19 and 20 of two consecutive envelopes may be opposite each other without the lids and the flanges 30 of two adjacent envelopes hindering each other.

The embodiment shown in FIG. 2 comprises eight elements and is particularly advantageous in the case of single crystals in which the sides of the trapezoidal section have a symmetric slope of 33° 30′ K. It is, of course advantageous to adapt the section of the semiconductor crystal of an element to the number of elements of the detector or conversely.

It will be obvious that the invention is not restricted to the embodiments described above and many variants are possible to those skilled in the art within the scope of this invention. For example, the semiconductor crystals may consist of silicon or course, $A^{III}$-$B^{V}$ compound, while the crystals may have a single compensated zone instead of two. Compensation with lithium may be completely avoided by using as a starting material for the detection elements semiconductor crystals of high resistivity, which may be provided with diffused zones of opposite conductivity types.

In the claims:

1. A semiconductor detector for ionizing radiation comprising a plurality of semiconductor detection elements forming a polygon, each of said elements comprising a semiconductor prism-shaped crystal having an isosceles trapezoidal base with parallel side faces of unequal size and oblique side faces, each of said crystals having at least one semiconductor electrical junction extending substantially parallel to the parallel side faces, said detection elements being arranged to form a regular polygon with the smaller of the parallel side faces of each crystal oriented towards the polygon center and with the oblique side faces adjacent one another.

2. A semiconductor detector as claimed in claim 1 wherein each of the detection elements is provided with an envelope also in the form of a prism having an isosceles trapezoidal base.

3. A semiconductor detector as claimed in claim 1 wherein the semiconductor crystal of each of the detection elements is a germanium crystal whose portions adjacent the two parallel side faces are of the one conductivity type, between which portions are provided two practically compensated zones separated from each other by a layer of the other conductivity type, said zones and portions forming five consecutive zones.

4. A semiconductor detector as claimed in claim 1 wherein the number of detection elements is at least 3 and at the most 12.

5. A semiconductor detector as claimed in claim 1 wherein the larger of the two parallel side faces of each detection element is substantially square.

6. A semiconductor detector as claimed in claim 2 wherein the envelope is substantially completely of aluminum and constitutes one of the electrodes of the detection element.

PO-1050
(5/69)

UNITED STATES PATENT OFFICE
CERTIFICATE OF CORRECTION

Patent No. 3621256      Dated November 16, 1971

Inventor(s) JEAN ANTOINE CACHEUX and JOHANNES MEULEMAN

It is certified that error appears in the above-identified patent and that said Letters Patent are hereby corrected as shown below:

In the Abstract, the abstract should read as follows:

-- A semiconductor detector, especially for gamma radiation, having a large sensitive volume is described. This is obtained by using semiconductor crystals which are prism-shaped with a trapezoidal base arranged in a circle to form a regular polygon defining a coaxial detector. Lithium compensated germanium may be employed for the semiconductor elements. --

Col. 1, between the title and the first paragraph, the following paragraph should be inserted:

-- The invention relates to a semiconductor detector for measuring and/or detecting ionizing radiation, having a large sensitive volume, particularly for gamma spectrometry. --

Col. 2, line 42,    "X" should be deleted.

Col. 3, line 49,    "IV-3 IV" should read -- IV-IV --.

Col. 3, line 65,    "kine of" should read -- kind --.

Col. 4, line 75,    "course" should read -- an --.

Signed and sealed this 30th day of May, 1972.

(SEAL)
Attest:

EDWARD M. FLETCHER, JR.
Attesting Officer

ROBERT GOTTSCHALK
Commissioner of Patents